United States Patent [19]

Beck et al.

[11] 4,057,297
[45] Nov. 8, 1977

[54] BRAKE MECHANISM WITH SPRING APPLIED FLUID PRESSURE RELEASED ASSEMBLY

[76] Inventors: Henry E. Beck, Oswego; Terry R. Collins, Lewistown, both of Ill.

[21] Appl. No.: 700,242

[22] Filed: June 28, 1976

[51] Int. Cl.² .............................................. B60T 13/22
[52] U.S. Cl. ..................................... 303/71; 188/72.3; 188/170
[58] Field of Search ................... 188/72.3, 170, 106 F, 188/72.4, 72.5; 192/91 R, 91 A; 303/71, 9, 13, 6 M

[56] References Cited

U.S. PATENT DOCUMENTS

| 3,547,234 | 12/1970 | Cummins et al. | 188/170 |
| 3,713,702 | 1/1973 | Campanini | 303/13 X |
| 3,724,609 | 4/1973 | Kobald | 188/170 |
| 3,770,085 | 11/1973 | Cottingham | 188/170 X |
| 3,791,492 | 2/1974 | Neilsen | 188/170 |

*Primary Examiner*—Trygve M. Blix
*Assistant Examiner*—Douglas C. Butler
*Attorney, Agent, or Firm*—Phillips, Moore, Weissenberger, Lempio & Majestic

[57] ABSTRACT

A brake mechanism includes a body and a piston movable relative thereto in braking and brake-releasing directions. A spring is disposed within a chamber defined by the body and piston to urge the piston in a brake-applying direction, and pressurized air may be selectively directed to such chamber to the piston in a brake-applying direction.

1 Claim, 2 Drawing Figures

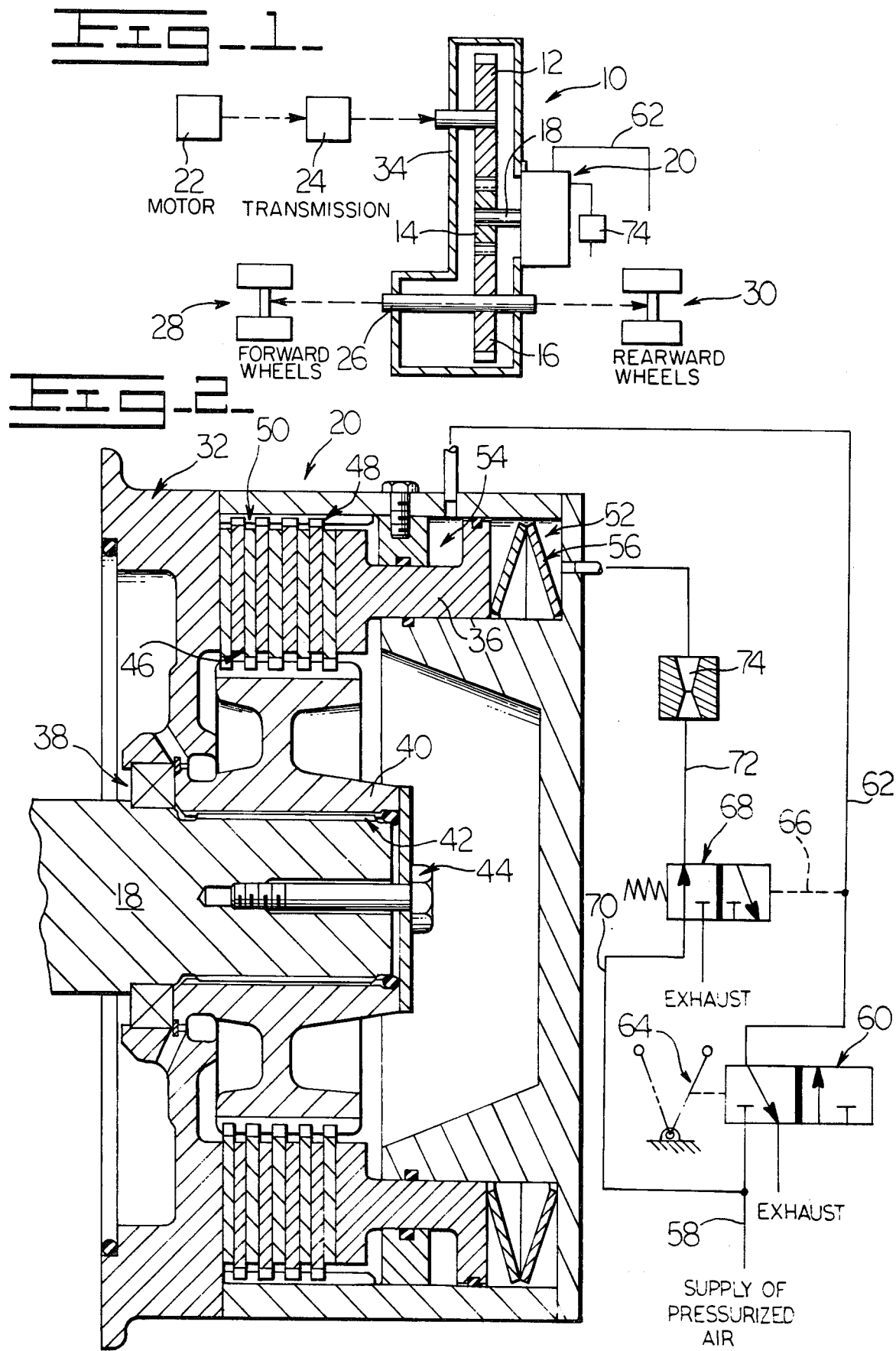

BRAKE MECHANISM WITH SPRING APPLIED FLUID PRESSURE RELEASED ASSEMBLY

BACKGROUND OF THE INVENTION

This invention relates to brake mechanisms, and more particularly, to a brake mechanism including a booster system wherein air pressure may be applied to a piston to move the piston in addition to spring force being applied thereto.

In a system for braking a large vehicle, it is well-known to provide that the brakes thereof release upon application of fluid pressure thereto, and are applied by spring means associated with the brakes upon the release of such fluid pressure therefrom. In a typical parking brake arrangement for such a vehicle, the spring means apply the brakes of the vehicle upon selective release of such fluid pressure. In such a system, it may occur that the operator of the vehicle applies the parking brake in a manner described, and then inadvertently operates the vehicle with the parking brake still applied. With the relatively great power of the vehicle involved, it will be understood that it is indeed possible under certain circumstances to greatly wear such parking brake system.

The substance of the present invention relates to the application of force to the piston in a brake-applying direction, in addition to the spring force described above. U.S. Pat. No. 3,791,492 discloses a brake mechanism incorporating application of fluid pressure to and release of fluid pressure from certain chambers thereof. Such patent discloses the application of fluid pressure into a chamber wherein a spring is disposed. However, it will be noted that such spring force is overcome upon application of fluid pressure to such chamber, i.e. the pressure applied to the chamber does not provide force additional to the force of the spring to apply the brakes of the vehicle.

SUMMARY OF THE INVENTION

It is accordingly an object of this invention to provide a brake mechanism wherein resilient spring means are utilized to apply the brakes, and wherein force additional to the force supplied by such spring means may be selectively applied to the piston to additionally urge the piston in a brake-applying direction.

It is a further object of this invention to provide a brake mechanism which, while fulfilling the above object, operates in a highly efficient manner, and is extremely simple in design.

Broadly stated, the brake mechanism comprises body means, and a piston movable relative to the body means in a first braking direction, and in a second brake-releasing direction, and defining with the body means a chamber. Spring means are operatively connected with the piston and body means for urging the piston in a brake-applying direction. Further included are means for selectively directing pressurized fluid into the chamber to urge the piston in a braking direction in addition to the urging thereof by the spring means, and for selectively allowing release of fluid pressure from the chamber.

BRIEF DESCRIPTION OF THE DRAWINGS

These and other objects of the invention will become apparent from a study of the following specification and drawings, wherein:

FIG. 1 is an overall schematic view of an apparatus incorporating the invention; and FIG. 2 is a sectional view of the brake mechanism of FIG. 1, including a schematic representation of the overall brake system of which such brake mechanism is a part.

DESCRIPTION OF THE PREFERRED EMBODIMENT

Shown in FIG. 1 is a transfer gear system 10 including gears 12, 14, 16, the intermediate gear 14 of which has a shaft 18 opertively coupled with the brake mechanism 20 of FIG. 2. The motor 22 of the vehicle (not shown) drives through a transmission 24 to drive the input gear 12 of the transfer gear system 10, the input gear 12 in turn driving the intermediate gear 14 which in turn drives the output gear 16 of the transfer gear system 10. The output shaft 26 of the output gear 16 in turn drives the forward and rearward wheels 28, 30 of the vehicle.

The brake mechanism 20 includes a body 32 secured to the case 34 of the transfer gear system 10, and a piston 36 is slidably mounted within the body 32 so as to be movable relative thereto. The end of the shaft 18 penetrates into the body 32, and is rotatably supported therein by a bearing 38. The inner end of the shaft 18 has mounted thereon a hub 40, being mounted thereon by splines 42 and being held thereon by a washer and bolt assembly 44 secured to the shaft 18. A plurality of friction discs 46 are mounted about the hub 40 for rotation therewith. A second plurality of friction discs 48 are mounted on splines 50 defined by the body 32, the friction discs 46 being interleaved with the friction dics 48 as is well known.

It will be seen that with the shaft 18 rotating relative to the transfer gear case 34 and body 32, the friction discs 46 rotate with the hun 40 between the respective friction discs 48, with the piston 36 in a rightward position. Upon movement of the piston 36 leftward in FIG. 2, the friction discs 46, 48 are brought together to provide braking of the rotative movement of the shaft 18. It will therefore be seen that the piston 36 is movable in a braking direction leftward, as shown in FIG. 2, and in a brake-releasing direction rightward as shown in FIG. 2.

The piston 36 defines with the body 32 a first annular chamber 52, and defines with the body 32 a second annular chamber 54 separate from the first chamber 52. Resilient spring means 56 in the form of Belleville spring means are disposed within the chamber 52, operatively connected with the piston 36 and body 32 for urging the piston 36 in a brake-applying direction.

A conduit 58 leads from a supply of pressurized air to a two-positon valve 60, and a conduit 62 interconnects the valve 60 with the second chamber 54. An operating handle 64 is provided in the vehicle, to position the valve 60 in a first position wherein pressurized air is supplied to the second chamber 54, tending to move the piston 36 in a brake-releasing direction against the resilience of the Belleville spring means 56. Manipulation of the operating handle 64 can move the valve 60 to its second position, as shown in FIG. 2, wherein air pressure is released from the second chamber 54.

A branch conduit 66 communicates with the conduit 62, and connects to another two-way valve 68. Yet another conduit 70 connects the valve 68 with conduit 58 while a conduit 72 connects with the first chamber 52, an orifice 74 being positioned in the conduit 72. The positioning and condition of the valve 68 is responsive to air pressure in the conduit 62, release of air pressure from the conduit 62 causing the valve 68 to adopt the position shown in FIG. 2, wherein the pressurized air supply communicates with the first chamber 52 through the orifice 74. Application of air pressure in the line 62 to the second chamber 54 provides a condition of the valve 68 wherein air pressure is released from the first chamber 52.

In the use of the apparatus, as the vehicle is being operated, the brake system is obviously in the inoperative position, with the operating handle 64 in the leftward position in FIG. 2, so that the valve 60 is positioned to apply air pressure to the chamber 54, moving the piston 36 in a brake-releasing direction against the resilience of the spring means 56. At the same time, the chamber 52 is opened to exhaust, it being remembered that the valve 68 will have shifted leftwardly (FIG. 2) due to the application of air pressure in the conduit 62 and the second chamber 54. If it is desired that the operator apply the brake of the vehicle, the handle 64 is moved to the rightward position shown in full in FIG. 2, causing the valve 60 to adopt the condition shown in FIG. 2, releasing air pressure from the chamber 54 through the conduit 62. Such release of air pressure in the conduit 62 causes the valve 68 to adopt the condition shown in FIG. 2, opening up the first chamber 52 to the supply of pressurized air, so that pressurized air is selectively directed into the chamber 52 upon release of air pressure from the second chamber 54 to urge the piston 36 in the brake-applying direction.

Such urging of the piston 36 due to the pressurized air in the chamber 52 is in addition to the urging of the piston 36 by the spring means 56. It should be noted that the orifice 74 is included so that upon initial movement of the handle 64 to the rightward position, the spring force will initially urge the piston 36 leftwardly, with the full application of air pressure to the first chamber 52 being delayed somewhat. That is, upon release of pressurized air from the second chamber 54, the spring means 56 immediately acts to urge and move the piston 36 leftwardly, but with a delay in the full application of air pressure to the first chamber 52, acting with the force of the spring means 56 on the piston 36, due to the orifice 74. Such orifice 74 is included so that the maximum braking force is not applied to the piston 36 in an extremely sudden manner.

It has been found that with such air pressure in the first chamber 52, the force of the air pressure on the piston 36 in combination with the force of the spring means 56 on the piston 36 provides that the brake is applied with great force to in turn provide highly effective braking as chosen.

What is claimed is:
1. A brake mechanism comprising:
a body;
a piston movable relative to the body in a first braking direction and in a second brake-releasing direction, and defining with the body a first chamber;
spring means disposed within the first chamber and operatively connected with the piston and body for urging the piston in a brake-applying direction;
a first valve for selectively directing pressurized fluid into said first chamber to urge the piston in a brake-applying direction in addition to the urging thereof by the spring means, and for selectively allowing release of fluid pressure from the first chamber;
the body and piston defining a second chamber, introduction of pressurized fluid to the second chamber urging the piston in the brake-releasing direction against the resilience of the spring means;
a second valve for selectively directing pressurized fluid into said second chamber, and for selectively allowing release of fluid pressure from the second chamber;
means for providing that the first valve is directly responsive to release of fluid pressure from the second chamber to direct pressurized fluid into the first chamber and responsive to direction of pressurized fluid to the second chamber to release pressurized fluid from the first chamber; and
orifice means through which pressurized fluid is applied from the first valve to the first chamber for delaying full application of pressurized fluid to the first chamber upon release of fluid pressure from the second chamber.

* * * * *

UNITED STATES PATENT OFFICE
CERTIFICATE OF CORRECTION

Patent No. 4,057,297          Dated Nov. 8, 1977

Inventor(s) Henry E. Beck, et al

It is certified that error appears in the above-identified patent and that said Letters Patent are hereby corrected as shown below:

Assignee: Caterpillar Tractor Co., was omitted from title page of Letters Patent.

Signed and Sealed this

Fifteenth Day of August 1978

[SEAL]

Attest:

RUTH C. MASON  
Attesting Officer

DONALD W. BANNER  
Commissioner of Patents and Trademarks